(12) United States Patent
Moening et al.

(10) Patent No.: US 11,008,063 B2
(45) Date of Patent: May 18, 2021

(54) ADAPTIVE PEDAL ASSIST SYSTEMS AND CONTROL LOGIC WITH INPUT TORQUE FILTERS FOR INTELLIGENT E-BIKES

(71) Applicant: GM Global Technology Operations LLC, Detroit, MI (US)

(72) Inventors: Douglas J. Moening, Highland, MI (US); John Corn, Highland, MI (US); Adam J. Heisel, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 451 days.

(21) Appl. No.: 16/017,452

(22) Filed: Jun. 25, 2018

(65) Prior Publication Data

US 2019/0389535 A1     Dec. 26, 2019

(51) Int. Cl.
| | | |
|---|---|---|
| *B62M 6/50* | (2010.01) | |
| *B62M 6/90* | (2010.01) | |
| *B62J 45/20* | (2020.01) | |
| *B62J 99/00* | (2020.01) | |

(52) U.S. Cl.
CPC ............... *B62M 6/50* (2013.01); *B62J 99/00* (2013.01); *B62M 6/90* (2013.01); *B62J 45/20* (2020.02)

(58) Field of Classification Search
CPC ... B62M 6/50; B62M 6/90; B62J 99/00; B62J 45/20
See application file for complete search history.

(56) References Cited

U.S. PATENT DOCUMENTS

| | | |
|---|---|---|
| 3,921,741 A | 11/1975 | Garfinkle et al. |
| 5,878,831 A | 3/1999 | Saito et al. |
| 6,367,833 B1 | 4/2002 | Horiuchi |
| 6,580,188 B2 | 6/2003 | Katagiri et al. |
| 6,629,574 B2 | 10/2003 | Turner |
| 8,183,726 B2 | 5/2012 | Rittenhouse |
| 9,108,700 B2 | 8/2015 | Chen et al. |
| 9,771,124 B2 | 9/2017 | Seagraves et al. |
| 9,840,305 B1 | 12/2017 | Tsuchizawa et al. |
| 9,857,252 B2 | 1/2018 | Murugesan et al. |
| 2008/0177433 A1 | 7/2008 | Teo et al. |
| 2009/0102408 A1 | 4/2009 | De Jesus et al. |
| 2011/0160945 A1 | 6/2011 | Gale |
| 2011/0215548 A1 | 9/2011 | Horwat, Jr. |

(Continued)

*Primary Examiner* — Jacob D Knutson
(74) *Attorney, Agent, or Firm* — Quinn IP Law

(57) ABSTRACT

Presented herein are adaptive power assist systems for manually-powered vehicles, methods for operating such systems, and motor-assisted, operator-powered vehicles equipped with such systems. A method for regulating a power assist system includes a vehicle controller receiving torque sensor data indicative of user-generated torque input. The vehicle controller then determines: if the torque input is less than a commanded motor torque generated by a tractive motor; and, if a calibrated motor decay time of the tractive motor is less than a scaled cadence time of the user's cadence speed. Responsive to both determinations being positive, the vehicle controller calculates a torque decay factor based on the current cadence speed, and modifies the commanded motor torque based on this calculated torque decay factor. The vehicle controller then transmits command signals to the tractive motor to output a modulated motor torque according to the modified commanded motor torque.

20 Claims, 3 Drawing Sheets

(56) References Cited

U.S. PATENT DOCUMENTS

| | | |
|---|---|---|
| 2012/0202649 A1 | 8/2012 | Huber |
| 2013/0179016 A1 | 7/2013 | Gale |
| 2016/0082772 A1* | 3/2016 | Biderman ................ B60Q 9/00 301/6.5 |
| 2016/0304157 A1 | 10/2016 | Craven et al. |
| 2019/0308512 A1* | 10/2019 | Hasumi .................... B60L 9/18 |

* cited by examiner

ADAPTIVE PEDAL ASSIST SYSTEMS AND CONTROL LOGIC WITH INPUT TORQUE FILTERS FOR INTELLIGENT E-BIKES

INTRODUCTION

The present disclosure generally relates to motor-assisted, manually powered vehicles. More specifically, aspects of this disclosure relate to adaptive pedal assist systems and attendant control logic for motorized bicycles.

Many vehicles that have traditionally been powered by the vehicle's operator—be it hand-powered or foot-powered designs—may now be originally equipped with or retrofit to include a tractive motor for assisting with propelling the vehicle. The tractive motor, which may take on the form of an internal combustion engine (ICE) or an electric motor, generally propels the vehicle in either an assisted or an unassisted capacity, i.e., with or without manually generated motive power. For instance, a pedal electric cycle (colloquially referred to as an "e-bike") is equipped with an on-board electric motor for providing supplemental tractive torque that assists or "boosts" a rider's pedal-generated torque. The tractive motor operates alone or in conjunction with a power transmission to rotate a driven member of the e-bike, such as a wheel, wheel hub, or pedal crank hub. Output torque from the motor may be selectively delivered to the driven member, e.g., when the rider negotiates a road surface with a pronounced gradient along a travel route. In this manner, the rider's perceived pedaling effort may be reduced when riding an e-bike relative to the perceived pedaling effort on a standard cycle lacking an electrical assist (e-assist) function.

SUMMARY

Disclosed herein are adaptive power assist systems and attendant control logic for manually-powered vehicles, methods for operating and methods for constructing such adaptive power assist systems, and motor-assisted, operator-powered vehicles with input torque filtering for adaptive power assist operations. By way of example, there is presented a motor control algorithm for an e-bike pedal assist system that utilizes any of multiple filtering strategies for real-time calculation of a conditioned rider input torque that is used for closed-loop modulation of commanded motor torque. The implemented filtering strategy may be selected based on rider-generated torque increase/decrease conditions, pedal cadence speed, user-selected e-assist level, and/or current motor decay. Unlike other motor-assisted systems where the primary input torque is relatively stable, rider-generated torque magnitude for an e-bike is cyclical in nature, fluctuating when the rider pushes a driven pedal to bottom dead center (BDC) and then allows this same pedal to recover on the return swing to top dead center (TDC). The motor control algorithm filters the rider torque input to minimize amplitude fluctuations, which helps to stabilize the motor torque output during e-assist modes.

Attendant benefits for at least some of the disclosed concepts may include the ability to aggregate and analyze user-generated torque input data and, based on this real-time data, tailor the level of power assist to a specific user. Other potential benefits of one or more disclosed systems, methods and devices may include the ability to intelligently adapt pedal assist to actively compensate for terrain changes and ambient conditions along a given route using filtered rider input torque data. While some available e-bike designs may offer variable e-assist based on sensed gradient changes or overall vehicle speeds, these designs are not self-adaptive to individual users nor are they able to offer route-specific adaptations. Aspects of the disclosed concepts help to ensure that an adaptive pedal assist system operates at optimal levels and, thus, minimizes battery usage while concomitantly extending vehicle operating range.

Aspects of this disclosure are directed to adaptive power assist techniques and computer-executable algorithms for operating motor-assisted, user-powered vehicles. For instance, a method is presented for regulating assistive torque output of a manually powered vehicle's power assist system. The manually powered vehicle includes a rigid vehicle frame with one or more road wheels rotatably mounted to the frame. The power assist system includes an electric or combustion-based tractive motor that is securely mounted to the vehicle frame and operable to drive at least one of the road wheels. A resident vehicle controller is mounted to the vehicle frame and governs output of the tractive motor. This representative method includes, in any order and in any combination with any of the disclosed features and options: receiving, from a torque sensor, sensor data indicative of a torque input of torque generated by a user to drive at least one of the road wheels, which may be the same as or different from the road wheel driven by the tractive motor; determining if the torque input is less than: (1) a commanded motor torque of torque generated by the tractive motor, or (2) a prior filtered torque input of torque generated by the user; determining if a calibrated motor decay time of the tractive motor is less than a scaled cadence time of a cadence speed of the user; in response to the torque input being less than the commanded motor torque/prior filtered torque input and the calibrated motor decay time being less than the scaled cadence time, determining a torque decay factor based, at least in part, on the cadence speed; determining: (1) a modified commanded motor torque by applying the torque decay factor to the commanded motor torque, or (2) an updated filtered torque input by applying the decay factor to the prior filtered torque input; and transmitting one or more command signals to the tractive motor to output a modulated motor torque according to the modified commanded motor torque/updated filtered torque input.

Other aspects of the present disclosure are directed to intelligent power assist systems for operator-powered vehicles. As used herein, the term "vehicle" and permutations thereof may include any relevant motorized vehicle platform that is powered predominantly by a human, such as motor-assisted cycles, scooters, skateboards, roller skates/blades, etc. In an example, a power assist system for a manually powered vehicle is presented that includes a tractive motor (ICE, electric, hybrid, etc.) that mounts on the vehicle's frame and drivingly connects to at least one of the vehicle's road wheels. The tractive motor is electronically controlled to selectively apply a variable assist torque to the vehicle wheel or wheels. A torque sensor mounts to the vehicle frame and monitors torque applied by a user to a manually operated input device to drive at least one of the vehicle wheels. The power assist system also includes a resident vehicle controller, a resident memory device, and a resident wireless communications device, all of which are designed to mount onto the vehicle frame.

Continuing with the above example, the resident vehicle controller, which is wired or wirelessly connected to the tractive motor and torque sensor, is programmed to execute various memory stored instructions. For instance, the vehicle controller receives sensor data from the torque sensor that is indicative of torque input magnitude generated by the user to drive at least one of the vehicle wheels. The vehicle controller then determines: (1) if a torque input magnitude is less than a commanded motor torque magnitude of torque generated by the tractive motor; and (2) if a calibrated motor decay time of the tractive motor is less than a scaled cadence time of a user's cadence speed. Responsive to both determinations being positive, the controller calculates a torque decay factor based, at least in part, on the cadence speed, and modifies the commanded motor torque based, at least in part, on the torque decay factor. The vehicle controller then transmits one or more command signals to the tractive motor to output a modulated motor torque according to the modified commanded motor torque.

Additional aspects of this disclosure are directed to manually powered vehicles with adaptive power assist capabilities. In an example, a pedal electric cycle is disclosed that includes a rigid vehicle frame with a pedal or handle crankset and multiple road wheels that are rotatably mounted to the vehicle frame. The crankset receives and transmits manually-generated torque to one or more of the vehicle's road wheels. A torque sensor monitors the manually-generated torque received from the user via the crankset and output signals indicative thereof. The pedal electric cycle is also equipped with a traction battery pack with sufficient charge capacity to power a tractive motor. In this regard, a controller-operated electric motor/generator unit (MGU) is electrically connected to the battery pack and operable to selectively impart electric-assist (e-assist) torque to at least one of the road wheels in response to motor control signals.

The pedal electric cycle is also equipped with a resident vehicle controller that is securely mounted to the vehicle frame and operatively connected to the electric MGU and crankset torque sensor. The resident vehicle controller is programmed to: receive, from the torque sensor, sensor data indicative of a torque input of torque generated by the user to drive at least one of the wheels; determine if a cadence direction for this torque input is in a forward direction; determine if the torque input is less than a commanded motor torque of torque generated by the tractive motor; determine if a calibrated motor decay time of the tractive motor is less than a scaled cadence time of a cadence speed of the user; in response to the cadence direction being in the forward direction and the torque input being less than the commanded motor torque and the calibrated motor decay time being less than the scaled cadence time, determine a torque decay factor based on at least the cadence speed; determine a modified commanded motor torque by applying the torque decay factor to the commanded motor torque; and, transmit a command signal to the tractive motor to output a modulated motor torque according to the modified commanded motor torque.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
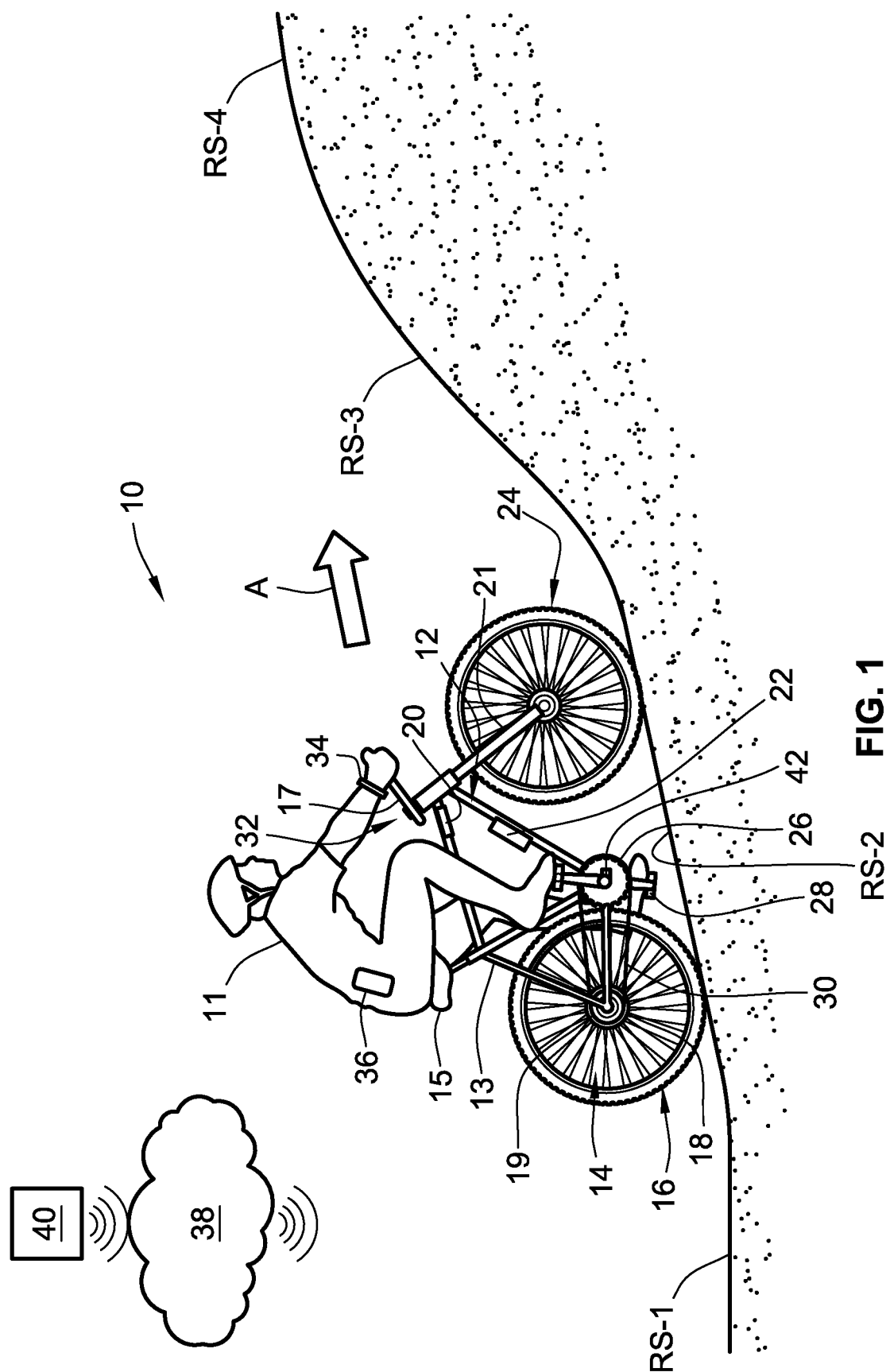
FIG. 1 is a partially schematic illustration of a representative motor-assisted, manually powered vehicle having adaptive power assist capabilities in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including" and "comprising" and "having" shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a forward driving direction of a motor-assisted manually powered vehicle when the vehicle is operatively oriented on a horizontal surface, for example.

Referring now to the drawings, wherein like reference numbers refer to like features throughout the several views, there is shown in FIG. 1 a representative user-powered, motor-assisted vehicle, which is designated generally at 10 and portrayed herein for purposes of discussion as a pedal electric cycle ("e-bike"). Distributed throughout the vehicle 10, e.g., packaged at different locations on a vehicle frame 12, is an adaptive pedal assist system 14 that provides supplemental torque for propelling the vehicle 10. The motor-assisted, user-powered vehicle 10 of FIG. 1—also referred to herein as "manually powered vehicle" or "vehicle" for brevity—is merely an exemplary application with which aspects and features of this disclosure may be practiced. In the same vein, implementation of the present concepts for an electric-motor-based pedal assist system 14 should also be appreciated as a representative application of the concepts and features disclosed herein. As such, it will be understood that aspects and features of this disclosure may be applied to other adaptive power assist architectures, and may be implemented for any logically relevant type of manually powered vehicle. Lastly, the drawings presented herein are not necessarily to scale and are provided purely for instructional purposes. Thus, the specific and relative dimensions shown in the drawings are not to be construed as limiting.

Adaptive pedal assist system 14 of FIG. 1 is generally composed of a tractive motor 18 that communicates with and is governed by a resident vehicle controller 20, both of which are securely mounted to the rigid vehicle frame 12. According to the illustrated example, the tractive motor 18 is a rear-mounted electric motor/generator unit (MGU) that is powered by a traction battery pack 22 for selectively driving a rear wheel unit 16 (e.g., tire, rim, spokes, hub, and axle). The tractive motor 18 may be mounted by a suitable mounting bracket or central hub 19 to a rear fork 13 of the vehicle frame 12. While shown as a direct drive propulsion unit, the tractive motor 18 may be coupled to the rear wheel unit 16 through a suitable power transmission, such as a belt-drive or a chain-drive transmission, for imparting motive power to the vehicle 10. Alternative power assist architectures may drivingly connect the tractive motor 18 to a steerable front wheel unit 24 or a centrally located crankset 26, or any combination of the wheel units 16, 24 and crankset 26, to provide driving power for propulsion of the vehicle 10. It is further envisioned that the vehicle 10 employ other prime movers for supplemental propulsion, including an internal combustion engine (ICE) assembly or a hybrid powertrain that employs both an electric machine and a combustion engine.

With continuing reference to FIG. 1, the tractive motor 18 is electrically connected to and energized by the traction battery pack 22 to propel the vehicle 10 in either an unassisted (self-propulsion) mode or an assisted (supplemental-propulsion) mode. Resident vehicle controller 20 is programmed to receive and process various user-input signals, sensor signals, and wireless data exchanges, and respond to these inputs by modulating the torque output of the tractive motor 18 via one or more motor control signals. During the assisted operating mode, the tractive motor 18 outputs an "e-assist" torque at a level sufficient to augment or "boost" user-generated torque while still satisfying, to the extent possible, one or more desired e-assist objectives of the user 11. When functioning in a self-propulsion or unassisted operating mode, the tractive motor 18 outputs a motive torque that is sufficient to temporarily propel the vehicle 10 without the rider pedaling. In this manner, the resident vehicle controller 20 may automatically allocate electrical energy from the traction battery pack 22 to the tractive motor 18 in real-time, and thus reserves and optimizes e-assist functions in real-time while the vehicle 10 negotiates a travel route.

Pedal electric cycle 10 of FIG. 1 may take on any suitable bike configuration, including unicycle, bicycle, tricycle, quadracycle, etc., and may incorporate a male, female, or unisex frame construction. The representative vehicle frame 12 is shown equipped with an adjustable, padded seat assembly 15 for supporting thereon a rider (or "user") 11. A handlebar set 17 or similarly suitable steering mechanism allows the rider 11 to manually control the heading and directional changes of the vehicle 10. Bicycle brake levers (not shown) mounted on the handlebar set 17 allow the user to selectively slow and stop the vehicle 10. Wheel units 16 and 24 (also referred to herein as "road wheels" or merely "wheels" for simplicity) are rotatably mounted to the vehicle frame 12 via respective rear and front forks 13 and 21. These wheel units 16 and 24 are in rolling frictional contact with a surface, which is represented in FIG. 1 by four adjoining, distinctly angled road sections RS1-RS4.

Using cyclical rotational motion of his/her feet and/or hands (e.g., for hand-powered applications), the rider 11 applies pedaling rotation to pedals 28 to generate motive forces to propel the vehicle 10. These forces are imparted to the components of an interconnected crankset 26, i.e., opposing crank arms rigidly secured to one or more sprockets. When the rider 11 rotates the crankset 26, the resultant rotation imparts manual pedaling torque to the rear road wheel 16. Torque transfer occurs via a drive mechanism 30, such as a closed loop of bike chain. The drive mechanism 30 is mechanically coupled to the central hub 19, e.g., via a complementary driven sprocket (not shown), in a rear wheel drive bicycle configuration. Thus, manual pedaling forces imparted by the rider 11 to the pedals 28 ultimately rotates the rear road wheel 16 and thereby propels the vehicle 10 over the road surface in the direction of arrow A. While shown drivingly connected to the same wheel unit 16, it is envisioned that the tractive motor 18 and crankset 26 may each be drivingly connected to a respective one of the wheel units 16, 24 for propelling the vehicle 10.

For at least some applications, the vehicle 10 may be optionally equipped with regenerative charging capabilities that enable the traction battery pack 22 to be recharged during operation of the vehicle 10. When the vehicle 10 is on a bikeway decline, for example, the wheels 16 and 24 may normally freewheel while gravity provisionally provides the motive force that propels the vehicle 10. Alternatively, the resident vehicle controller 20 may switch the tractive motor 18 from a motoring mode to a generator mode thereby allowing the motor 18 to produce electrical energy, e.g., by inducing electromagnetic induction through the motor's rotor and stator. In such a regenerative charging embodiment of the vehicle 10, the tractive motor 18 may be equipped with any requisite power conditioning equipment, e.g., a power inverter, DC-DC converter, link capacitors, and/or other power filtering components, etc.

E-assist capabilities may be selectively provided by the tractive motor 18 in response to motor control signals from the resident vehicle controller 20. Real-time interface of the rider 11 with the resident vehicle controller 20 may be facilitated via a human machine interface (HMI) 32 that is mounted onto the handlebar set 17 of the vehicle 10. A fitness tracker device, which is portrayed in FIG. 1 as a wearable electronic device 34, is operable to monitor the heart rate, caloric expenditure, perspiration, pedal rate, or any other such health-related and activity-related parameters of the rider 11. As another option, the rider 11 may use a cellular-enabled smartphone device 36 to provide additional inputs to the resident vehicle controller 20, such as real-time vehicle location tracking, user preferences and milestones, historical assist level data, etc. Each of the resident vehicle controller 20, wearable electronic device 34, and/or smartphone device 36 may communicate wirelessly with one another and with one or more remote computing nodes, depicted schematically as a cloud-based service 38 and a backend database server computer 40. Communication capabilities with remote, off-board networked devices may be provided via a cellular chipset/component, a wireless modem, a navigation and location chipset/component (e.g., GPS transceiver), a short-range wireless communication device (e.g., a Bluetooth® unit or near field communications (NFC) transceiver), a dual antenna, or any suitable means of wireless communication.

As indicated above, resident vehicle controller 20 is constructed and programmed to govern, among other things, operation of the tractive motor 18. Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), whether resident, remote or a combination of both. The controller 20 may execute one or more software or firmware programs or routines, combinational logic circuit(s), input/output circuit(s) and devices, and include appropriate signal conditioning and buffer circuitry, and other components to provide the described functionality. Software, firmware, programs, instructions, routines, code, algorithms and similar terms may mean any controller executable instruction sets including calibrations and look-up tables. The controller may be designed with a set of control routines executed to provide desired functions. Control routines are executed, such as by a central processing unit, and are operable to monitor inputs from sensing devices and other networked control modules, to execute control and diagnostic routines for controlling operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing vehicle use or operation. Alternatively, routines may be executed in response to occurrence of an event during operation of the vehicle 10.

Figure 2:
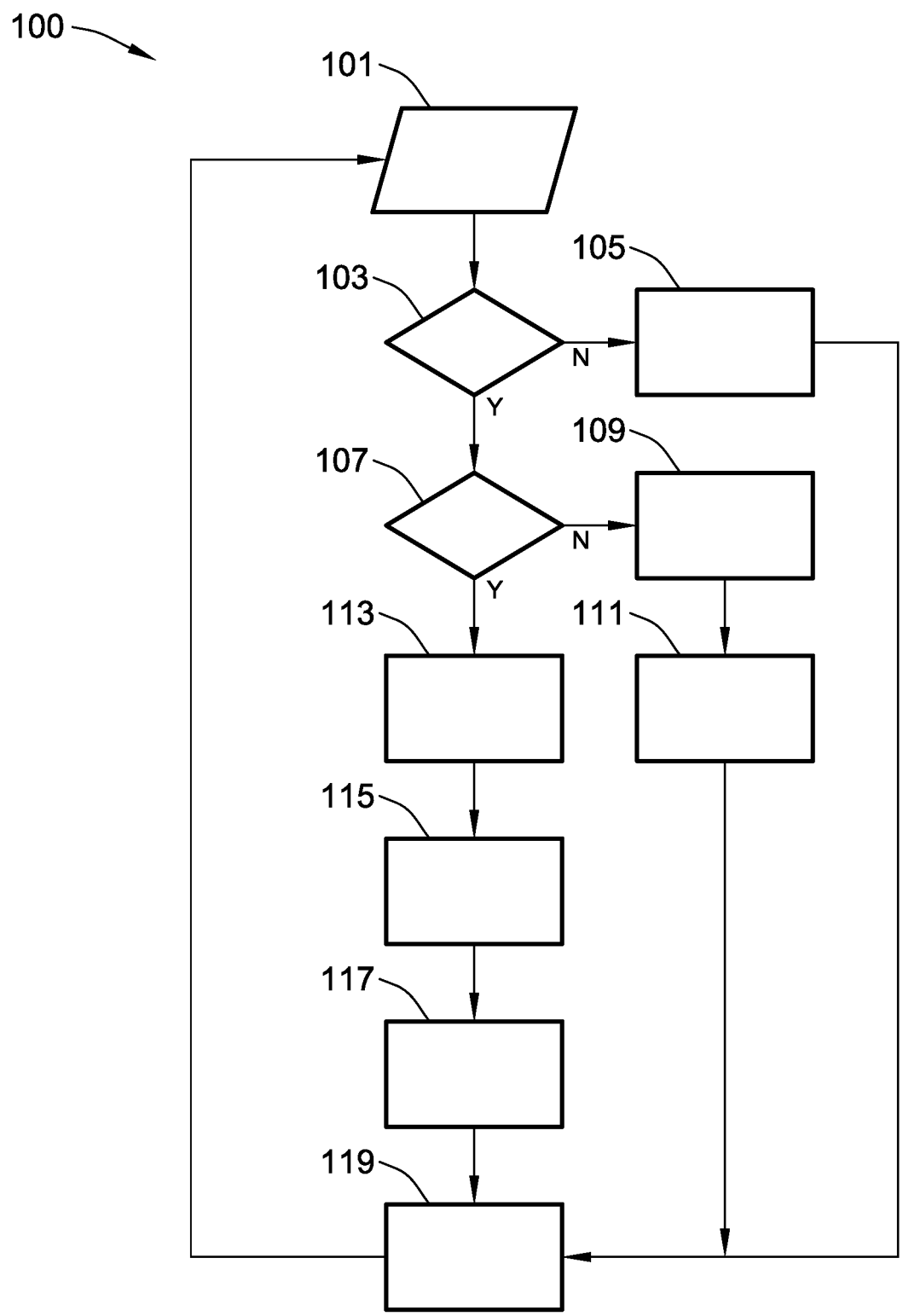
FIG. 2 is a flowchart for an automated power assist protocol for operating a manually powered vehicle that may correspond to instructions executed by onboard or remote control-logic circuitry, programmable electronic control unit, or other computer-based device or network of devices in accord with aspects of the disclosed concepts.

With reference now to the flow chart of FIG. 2, an improved method or control strategy for provisioning adaptive power assist capabilities to a manually powered vehicle, such as pedal electric cycle 10 of FIG. 1, is generally described at 100 in accordance with aspects of the present disclosure. Some or all of the operations illustrated in FIG. 2 and described in further detail below may be representative of an algorithm that corresponds to processor-executable instructions that may be stored, for example, in main or auxiliary or remote memory, and executed, for example, by an on-board or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at input/output block 101 with processor-executable instructions for a programmable controller or control module to receive real-time, user-specific power input data during operation of a manually powered vehicle. In the representative architecture of FIG. 1, for example, the resident vehicle controller 20 of the pedal electric cycle 10 communicates with a torque sensor 42 that monitors torque input at the crankset 26, e.g., at approximately 20 cycles per second (20 Hertz (Hz)). Torque sensor 42 produces and transmits sensor data (TorqueSample) that is indicative of pedal-generated torque that is input by a user 11 to drive the rear wheel unit 16. In a number of variations, the torque sensor 42 may take on the form of a magnetostatic strain gauge that is mechanically coupled to a chain ring or inner spindle of the crankset 26, and designed to measure a reaction torque from the crankset 26 that is approximately proportional to the rider's input torque. At any given wheel speed, the rider 11 may maintain or modify wheel speed while changing his/her pedaling rate or power input by manually shifting a derailleur lever (not shown) to change the bike-chain sprocket that is in use.

Using the data that is retrieved, accessed or collected (collectively "received") at input/output block 101, the method 100 will ascertain at decision block 103 whether or not the cadence direction of the rider's pedaling is in a forward direction (CadenceDir=Forward). By way of example, and not limitation, real-time sensor data output by the torque sensor 42 may be used by the resident vehicle controller 20 to determine a current cadence direction of the user's pedal-generated torque. For instance, a sensor signal that indicates a torque input of any magnitude (e.g., for a unidirectional torque gauge) or any positive magnitude (e.g., for a bidirectional torque gauge) may be indicative of a forward pedaling direction. Conversely, a sensor signal that indicates a zero torque input or a negative magnitude may be indicative of a rearward pedaling direction or no pedaling input at crankset 26. Responsive to a determination that the cadence direction is not in a forward direction (Block 103=NO), the method 100 continues to process block 105 with instructions for the controller 20 to set motor torque command to zero (TorqueCommand=0), and then advances to process block 119 to transmit one or more command signals to the tractive motor 18 to stop outputting motor torque in accordance with the zeroed motor torque command. For at least some applications, process block 105 may further include (or may be replaced with) setting a filtered user-generated torque input value to zero (FilteredInputTrq=0), which would concomitantly change motor torque command to zero. The method 100 may thereafter terminate or may loop back to input/output block 101 and run in a continuous loop.

Figure 3:
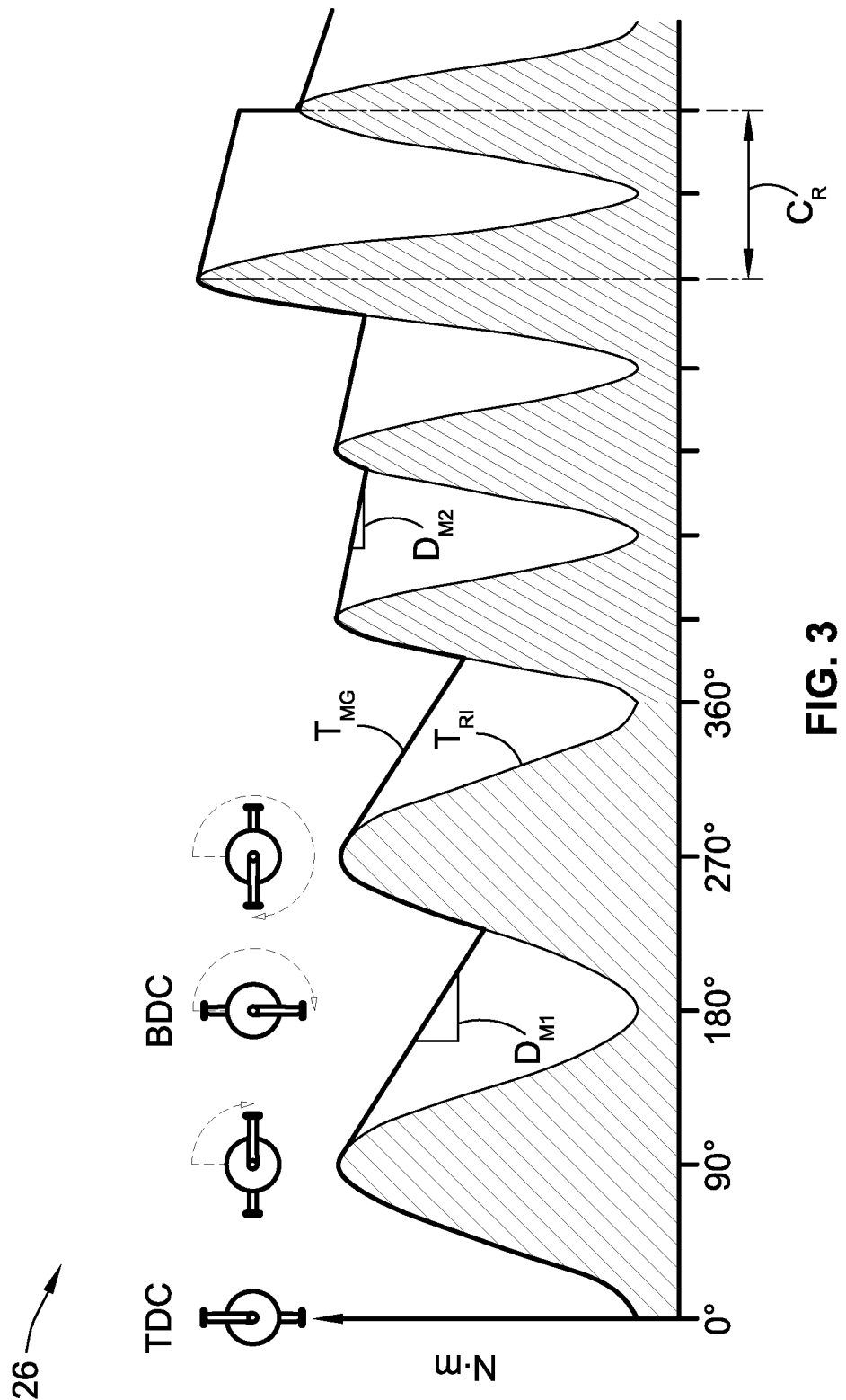
FIG. 3 is a graph of torque versus pedal position of an e-bike to illustrate a representative motor-generated assist torque as a function of filtered rider input torque and pedal cadence in accordance with aspects of the present disclosure.

If it is determined that the rider's cadence direction is in the forward direction (Block 103=YES), method 100 proceeds to decision block 107 to determine: (1) if the rider's torque input is less than the tractive motor's commanded motor torque (TorqueSample<prevTorqueCommand); and (2) if a calibrated motor decay time of the tractive motor is less than a scaled cadence time of the user's cadence speed (DecayTime<CadenceRatio). Of the foregoing two determinations, the former may be supplemented with, or replaced by, determining if the rider's torque input is less than a prior filtered torque input value of user-generated torque (TorqueSample<prevFilteredInputTrq). Commanded motor torque (prevTorqueCommand) may correspond to a memory-stored, previously commanded motor torque value from a prior function call during operation of the power assist system 14. In contrast, calibrated motor decay time (DecayTime) may correspond to a memory-stored, preset maximum permitted time for controlled decay of output torque generated by the tractive motor 18. Generally speaking, decay time may be typified as a time keeping variable used as a check against the scaled cadence time. Scaled cadence time (CadenceRatio) may be set equal to a current time for the user 11 to complete a one-half rotation of the crankset 26, i.e., pushing a driven pedal from top dead center (TDC) to bottom dead center (BDC), as shown in FIG. 3.

Generally speaking, the scaled cadence time is a time value calculated as a function of cadence rotations per minute (RPM) and a constant scalar multiplier.

If any one of the determinations conducted at decision block 107 is returned as false (Block 107=NO), namely if TorqueSample≥PrevTorqueCommand OR DecayTime≥CadenceRatio OR (optionally) TorqueSample≥PrevFilteredInputTrq, the method 100 proceeds to process block 109 to reset the calibrated motor decay time (Reset DecayTime) to a default motor decay time (e.g., zero (0)). Contemporaneous with resetting the decay time, the method 100 proceeds to process block 111 with instructions for the resident vehicle controller 20 to set motor torque command equal to the rider's torque input (TorqueCommand=TorqueSample), and then advances to process block 119 to transmit one or more command signals to the tractive motor 18 to output motor torque in accordance with the newly defined motor torque command. For at least some applications, process block 111 may further include (or may be replaced with) setting the filtered user-generated torque input value to the torque sample value (FilteredInputTrq=TorqueSample). In either case, motor torque command is set approximately equal to the originally received torque sample to realign tractive motor torque output with the unfiltered signal value.

Upon determining that the rider's torque input is less than the tractive motor's commanded motor torque AND the calibrated motor decay time is less than the scaled cadence time AND (optionally) rider torque input is less than the prior filtered torque input value (Block 107=YES), the method 100 continues to process block 113 and raises the calibrated motor decay time by a predetermined increment value (Increment DecayTime). For at least some implementations, the preset maximum permitted time for controlled decay of motor output torque is incremented by a factor of 1. After incrementing the decay time, the method 100 moves on to process block 115 to calculate, call-up, estimate, or retrieve (collectively "determine") a torque decay factor (TorqueDecayFactor Lookup). As an example, the torque decay factor may be a multiplier retrieved from a lookup table stored in a local memory device. This decay factor might be larger at higher cadence speeds (e.g., TorqueDecayFactor$_{HI}$=0.99), and might by smaller at lower cadence speeds (e.g., TorqueDecayFactor$_{LO}$=0.70). Alternative embodiments may calculate each torque decay factor in real-time. Torque decay factor may be a fractional multiplier that operates to reduce the previous torque sample as a function of current cadence speed. In implementations where a filtered input torque signal is a desired output of the method 100, the torque decay factor may be further based on a desired assist level that is selected by the user 11, e.g., using an electronic user input device, such as HMI 32, wearable electronic device 34, and/or smartphone 36 of FIG. 1.

With continuing reference to FIG. 2, the method 100 moves to process block 117 with processor-executable instructions for a local or remote computing device, such as resident vehicle controller 20, to calculate a modified commanded motor torque by applying the torque decay factor identified at process block 115 to the prior commanded motor torque (TorqueCommand=prevTorqueCommand*TorqueDecayFactor). In so doing, the rate of decay of the tractive motor 18 may be controlled by multiplying the previous torque command by the decay factor. Process block 117 may be supplemented with, or replaced by, instructions to calculate a modified filtered input torque by applying the torque decay factor to the prior filtered torque input value (FilteredInputTrq=prevFilteredInputTrq*TorqueDecayFactor). Once the modified motor torque command and/or modified filtered input torque is/are calculated, the vehicle controller 20 transmits one or more command signals to the tractive motor 18 to output a modulated motor torque according to the modified motor torque command/filtered input torque at process block 119. Prior to transmitting a motor torque command at block 119, the user's filtered input torque may require further processing, such as multiplying the filtered input torque by a calibrated factor, limiting the filtered input torque for battery power limitations, constraining the filtered input torque due to motor limitations, and/or shaping a desired ramp in or out to meet drive quality requirements.

FIG. 3 graphically illustrates a representational plot of raw, unfiltered rider input torque $T_{RI}$ (crankset input torque magnitude measured in Newton-meters (N·m)) as a function of pedaling cadence (crankset pedal position measured in degrees (°)). A representative motor-generated assist torque $T_{MG}$ of an electric motor is juxtaposed with the unfiltered rider input torque $T_{RI}$. As described above, this motor-generated assist torque $T_{MG}$ may be modulated in real-time as a function of filtered rider input torque and pedal cadence. The graph of FIG. 3 helps to show how a raw input torque value is filtered to generate a more stable, less-cyclical motor torque command. In general, the cadence speed of the rider's pedal input may be multiplied by a calibrated scalar value to define a maximum decay time for the motor's output torque. An example cadence ratio $C_R$, which may be the product of cadence speed and a constant scalar multiplier, is shown on the right-hand side of FIG. 3. Max decay time is then used to limit or otherwise slow motor output torque decay, e.g., to one half cadence rotation, to help ameliorate a perceptible sailing effect in the motor output torque during e-assist. Examples of changing motor decay—a first torque decay factor $D_{M1}$ and a second torque decay factor $D_{M2}$—as a function of cadence and assist level is presented in FIG. 3 to show a decrease in allotted decay time for the tractive motor when cadence speed has increased while the magnitude of pedal input torque cycles between approximately the same values.

Aspects of this disclosure may be implemented, in some embodiments, through a computer-executable program of instructions, such as program modules, generally referred to as software applications or application programs executed by an onboard computing device or a distributed network of resident and remote computing devices. The software may include, in non-limiting examples, routines, programs, objects, components, and data structures that perform particular tasks or implement particular data types. The software may form an interface to allow a controller or processor to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM), as non-limiting examples.

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices. Persons of ordinary skill will readily appreciate that the entire algorithm and/or parts thereof could alternatively be executed by a device other than a controller and/or embodied in firmware or dedicated hardware in an available manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill will readily appreciate that many other methods of implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for regulating a power assist system of a manually powered vehicle, the manually powered vehicle including a frame with one or more wheels attached to the frame, the power assist system including a vehicle controller and a tractive motor attached to the frame and operable to drive at least one of the one or more wheels, the method comprising:
   receiving, via the vehicle controller from a torque sensor, sensor data indicative of a torque input of torque generated by a user to drive at least one of the one or more wheels;
   determining, via the vehicle controller, if the torque input is less than a commanded motor torque of torque generated by the tractive motor;
   determining, via the vehicle controller, if a calibrated motor decay time of the tractive motor is less than a scaled cadence time of a cadence speed of the user;
   in response to the torque input being less than the commanded motor torque and the calibrated motor decay time being less than the scaled cadence time, determining a torque decay factor based on the cadence speed;
   determining a modified commanded motor torque by applying the torque decay factor to the commanded motor torque; and
   transmitting, via the vehicle controller to the tractive motor, a command signal to output a modulated motor torque according to the modified commanded motor torque.

2. The method of claim 1, further comprising:
   determining a cadence direction of the torque input generated by the user; and
   determining, via the vehicle controller, if the cadence direction is in a forward direction,
   wherein determining the torque decay factor is further in response to the cadence direction being in the forward direction.

3. The method of claim 2, further comprising transmitting, via the vehicle controller to the tractive motor in response to the cadence direction not being in the forward direction, a command signal to stop outputting motor torque.

4. The method of claim 1, further comprising transmitting, via the vehicle controller to the tractive motor in response to the torque input not being less than the commanded motor torque, a command signal to output a motor torque equal to the torque input.

5. The method of claim 4, further comprising, in response to the torque input not being less than the commanded motor torque, resetting the calibrated motor decay time to a default motor decay time.

6. The method of claim 1, further comprising transmitting, via the vehicle controller to the tractive motor in response to the calibrated motor decay time not being less than the scaled cadence time, a command signal to output a motor torque equal to the torque input.

7. The method of claim 6, further comprising, in response to the calibrated motor decay time not being less than the scaled cadence time, resetting the calibrated motor decay time to a default motor decay time.

8. The method of claim 1, further comprising, in response to the torque input being less than the commanded motor torque and the calibrated motor decay time being less than the scaled cadence time, incrementing the calibrated motor decay time by a predetermined increment value.

9. The method of claim 1, further comprising:
   receiving, via the vehicle controller from an electronic user input device, a desired assist level selected by the user,
   wherein determining the torque decay factor is further based on the desired assist level.

10. The method of claim 1, wherein the calibrated motor decay time of the tractive motor is a predetermined maximum time allowed for a controlled decay of the torque generated by the tractive motor.

11. The method of claim 1, wherein the manually powered vehicle is a pedal electric cycle with a crankset attached to the frame and configured to impart a pedaling torque generated by the user to the at least one of the one or more wheels, and wherein the scaled cadence time is equal to a time for the user to complete a one-half rotation of the crankset while generating the pedaling torque.

12. The method of claim 1, wherein the vehicle controller is communicatively connected to a memory device, and wherein determining the torque decay factor includes retrieving a multiplier from a lookup table stored in the memory device.

13. The method of claim 1, wherein the commanded motor torque corresponds to a previous commanded motor torque from a previous function call during operation of the power assist system.

14. The method of claim 1, further comprising:
   determining, via the vehicle controller, if the torque input is less than a previous filtered input torque of torque generated by the user;
   in response to the torque input being less than the previous filtered input torque and the calibrated motor decay time being less than the scaled cadence time, determining the torque decay factor based on the cadence speed and a user-selected assist level; and determining a modified filtered input torque by applying the torque decay factor to the previous filtered input torque.

15. A power assist system for a manually powered vehicle, the manually powered vehicle including a frame, one or more wheels mounted to the frame, and a manually operated input device configured to drive at least one of the one or more wheels, the power assist system comprising:

a tractive motor configured to mount to the frame of the manually powered vehicle and drivingly connect to at least one of the one or more wheels;

a torque sensor configured to mount to the frame and monitor torque applied by a user to the manually operated input device to drive at least one of the one or more wheels; and a vehicle controller configured to mount to the frame and communicate with the tractive motor and the torque sensor, the vehicle controller being programmed to:

receive, from the torque sensor, sensor data indicative of a torque input of torque generated by the user to drive at least one of the one or more wheels;

determine if the torque input is less than a commanded motor torque of torque generated by the tractive motor;

determine if a calibrated motor decay time of the tractive motor is less than a scaled cadence time of a cadence speed of the user;

in response to the torque input being less than the commanded motor torque and the calibrated motor decay time being less than the scaled cadence time, determine a torque decay factor based on the cadence speed;

determine a modified commanded motor torque by applying the torque decay factor to the commanded motor torque; and transmit a command signal to the tractive motor to output a modulated motor torque according to the modified commanded motor torque.

16. A pedal electric cycle comprising:

a vehicle frame;

a plurality of road wheels rotatably mounted to the vehicle frame;

a crankset mounted to the vehicle frame and configured to receive a manually generated torque from a user and transmit the torque to at least one of the road wheels;

a torque sensor mounted to the vehicle frame and configured to monitor the manually generated torque received from the user via the crankset;

a traction battery pack mounted to the vehicle frame;

an electric tractive motor mounted to the vehicle frame and electrically connected to the traction battery pack, the electric tractive motor being configured to selectively impart electric-assist torque to at least one of the road wheels; and a resident vehicle controller mounted to the vehicle frame and operatively connected to the electric tractive motor and the torque sensor, the resident vehicle controller being programmed to:

receive, from the torque sensor, sensor data indicative of a torque input of torque generated by the user to drive at least one of the wheels;

determine if a cadence direction of the torque input is in a forward direction;

determine if the torque input is less than a commanded motor torque of torque generated by the tractive motor;

determine if a calibrated motor decay time of the tractive motor is less than a scaled cadence time of a cadence speed of the user;

in response to the cadence direction being in the forward direction and the torque input being less than the commanded motor torque and the calibrated motor decay time being less than the scaled cadence time, determine a torque decay factor based on the cadence speed;

determine a modified commanded motor torque by applying the torque decay factor to the commanded motor torque; and transmit a command signal to the tractive motor to output a modulated motor torque according to the modified commanded motor torque.

17. The pedal electric cycle of claim 16, wherein the resident vehicle controller is further programmed to transmit a command signal to the electric tractive motor to stop outputting torque in response to the cadence direction not being in the forward direction.

18. The pedal electric cycle of claim 16, wherein the resident vehicle controller is further programmed to transmit command signals to the electric tractive motor to output a motor torque equal to the torque input in response to either one of the torque input not being less than the commanded motor torque or the calibrated motor decay time not being less than the scaled cadence time.

19. The pedal electric cycle of claim 16, wherein the resident vehicle controller is further programmed to reset the calibrated motor decay time to a default motor decay time in response to either one of the torque input not being less than the commanded motor torque or the calibrated motor decay time not being less than the scaled cadence time.

20. The pedal electric cycle of claim 16, wherein determining the torque decay factor is further based on a desired assist level received by the resident vehicle controller from the user via an electronic user input device.

\* \* \* \* \*